(12) United States Patent
Brewen et al.

(10) Patent No.: US 8,584,816 B2
(45) Date of Patent: Nov. 19, 2013

(54) ENHANCED DAMPING USING CRYOGENIC COOLING

(75) Inventors: Alan Thomas Brewen, Rochester, NY (US); John Craig Fasick, Lima, NY (US); Douglas William Gates, Rochester, NY (US); Phillip Vallone, Honeoye Falls, NY (US)

(73) Assignee: Exelis, Inc., McLean, VA (US)

( * ) Notice: Subject to any disclaimer, the term of this patent is extended or adjusted under 35 U.S.C. 154(b) by 0 days.

(21) Appl. No.: 13/354,737

(22) Filed: Jan. 20, 2012

(65) Prior Publication Data

US 2012/0118687 A1 May 17, 2012

Related U.S. Application Data

(62) Division of application No. 12/640,394, filed on Dec. 17, 2009, now abandoned.

(51) Int. Cl.
*F16F 15/03* (2006.01)
(52) U.S. Cl.
USPC .......................................................... 188/267
(58) Field of Classification Search
USPC .................................. 188/267, 274, 276, 164
See application file for complete search history.

(56) References Cited

U.S. PATENT DOCUMENTS

| | | |
|---|---|---|
| 1,706,171 A | 3/1929 | Kinnard |
| 2,888,634 A | 5/1959 | Ault |
| 3,573,518 A | 4/1971 | Liles |
| 3,921,746 A | 11/1975 | Lewus |
| 4,030,031 A | 6/1977 | Stucker |
| 4,260,901 A | 4/1981 | Woodbridge |
| 4,517,505 A | 5/1985 | Cunningham |
| 4,815,574 A | 3/1989 | Taylor |
| 5,054,587 A | 10/1991 | Matsui |
| 5,122,506 A | 6/1992 | Wang |
| 5,249,783 A | 10/1993 | Davis |
| 5,342,825 A * | 8/1994 | Iannello et al. ............... 505/166 |
| 5,392,881 A | 2/1995 | Cho et al. |
| 5,445,249 A | 8/1995 | Aida |
| 5,736,798 A | 4/1998 | O'Brien et al. |
| 5,749,243 A | 5/1998 | Lester |
| 5,856,638 A | 1/1999 | Burkhard et al. |
| 5,896,961 A | 4/1999 | Aida |
| 5,934,028 A | 8/1999 | Taylor |

(Continued)

FOREIGN PATENT DOCUMENTS

| | | |
|---|---|---|
| DE | 203 18 389 | 2/2004 |
| JP | 5 033828 | 2/1993 |
| JP | 2000 120682 | 4/2000 |

OTHER PUBLICATIONS

U.S. Appl. No. 12/640,394, Final Office Action mailed Oct. 21, 2011, 10 pgs.

(Continued)

*Primary Examiner* — Bradley King
*Assistant Examiner* — Vu Q Nguyen
(74) *Attorney, Agent, or Firm* — Ratnerprestia

(57) ABSTRACT

A damping apparatus is disclosed having at least one magnet, a conducting member movable relative to the magnet, a cryogenic fluid, and a channel that confines the cryogenic fluid in contact with the conducting member. The cryogenic fluid may maintain the conducting member at cryogenic temperatures, thereby increasing a damping force provided by the conducting member to a payload.

6 Claims, 12 Drawing Sheets

(56) References Cited

U.S. PATENT DOCUMENTS

| | | |
|---|---|---|
| 5,947,237 A | 9/1999 | McMichael |
| 6,008,881 A | 12/1999 | Warmerdam |
| 6,019,201 A | 2/2000 | Gordaninejad |
| 6,064,132 A | 5/2000 | Nose |
| 6,195,372 B1 * | 2/2001 | Brown .......................... 372/34 |
| 6,327,024 B1 | 12/2001 | Hayashi et al. |
| 6,333,848 B1 | 12/2001 | Aida |
| 6,501,203 B2 | 12/2002 | Tryggvason |
| 6,505,718 B2 | 1/2003 | Fujita |
| 6,982,502 B1 | 1/2006 | Sendaula et al. |
| 7,012,340 B2 | 3/2006 | Yi |
| 7,196,601 B1 | 3/2007 | Gottschalk |
| 7,323,790 B2 | 1/2008 | Taylor et al. |
| 7,633,202 B2 | 12/2009 | Hull |
| 2003/0146748 A1 | 8/2003 | Duncan et al. |
| 2007/0131830 A1 | 6/2007 | Brennan |
| 2008/0209919 A1 | 9/2008 | Ackermann |

OTHER PUBLICATIONS

U.S. Appl. No. 12/640,394, Non-Final Office Action mailed Mar. 24, 2011, 14 pgs.

Berton, Stefano, et al., "Amplification System for Supplemental Damping Devices in Seismic Applications", Journal of Structural Engineering (Jun. 2005), 979-983.

European Patent Search for EP 10189805.4-1264, EPO, Apr. 5, 2012.

EPO Search Report for EP 10 19 5290, Jordan, David, EPO Examiner, Nov. 26, 2012.

* cited by examiner

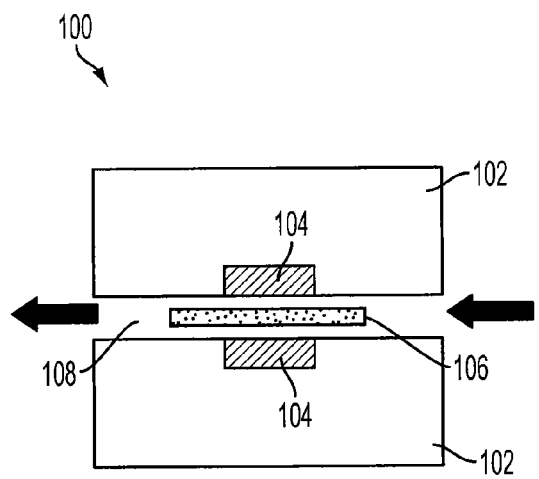
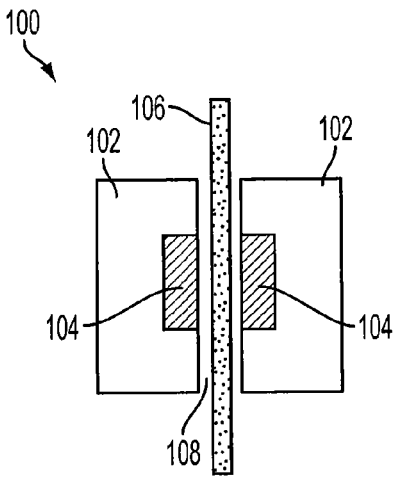
FIG. 1A  FIG. 1B
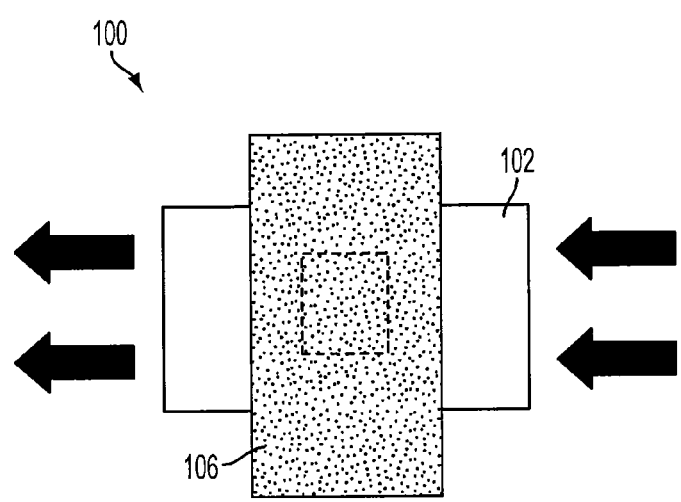
FIG. 1C

ENHANCED DAMPING USING CRYOGENIC COOLING

This application is a divisional application of U.S. patent application Ser. No. 12/640,394, entitled "ENHANCED DAMPING USING CRYOGENIC COOLING," filed Dec. 17, 2009, the contents of which are incorporated herein by reference.

FIELD OF THE INVENTION

This invention relates to the field of linear vibration damping apparatus, and more particularly to magnetic dampers.

BACKGROUND OF THE INVENTION

Linear dampers are devices designed to provide absorption of shock and smooth deceleration in linear motion applications. Dampers provide shock absorption through the application of a damping force in the direction of the linear motion. Dampers may generate the damping force from a variety of means. Dampers may be mechanical (e.g., elastomeric or wire rope isolators), fluid (e.g. gas, air, hydraulic), or even magnetic (e.g. through magnetically induced eddy currents).

Magnetic dampers provide a linear damping element in a compact form. Magnetic dampers do not suffer from certain problems associated with hydraulic dampers including friction or leaking of fluids. Additionally, magnetic dampers can operate more consistently over wider temperature ranges than fluidic dampers. However, when not used at cryogenic temperatures magnetic dampers can be relatively heavy. An exemplary magnetic damper is disclosed in U.S. patent application Ser. No. 11/304,974 to Brennan et al., which is included herein by reference.

SUMMARY OF THE INVENTION

Aspects of the present invention are directed to damping apparatus. In accordance with one aspect of the present invention, a damping apparatus is disclosed having at least one magnet, a conducting member movable relative to the magnet, a cryogenic fluid, and a channel that confines the cryogenic fluid in contact with the conducting member. The cryogenic fluid may maintain the conducting member at cryogenic temperatures, thereby increasing a damping force provided by the conducting member to a payload.

In accordance with another aspect of the present invention, a damping apparatus is disclosed having at least one magnet, a conducting member movable relative to the magnet, and a channel adapted to confine a cryogenic fluid in contact with the conducting member. The cryogenic fluid may maintain the conducting member at cryogenic temperatures, thereby increasing a damping force provided by the conducting member to a payload.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale. On the contrary, the dimensions of the various features are arbitrarily expanded or reduced for clarity. Included in the drawings are the following figures:

FIGS. 1A-1E are diagrams of an exemplary damping apparatus in accordance with an aspect of the present invention;

DETAILED DESCRIPTION OF THE INVENTION

Figure 1D:
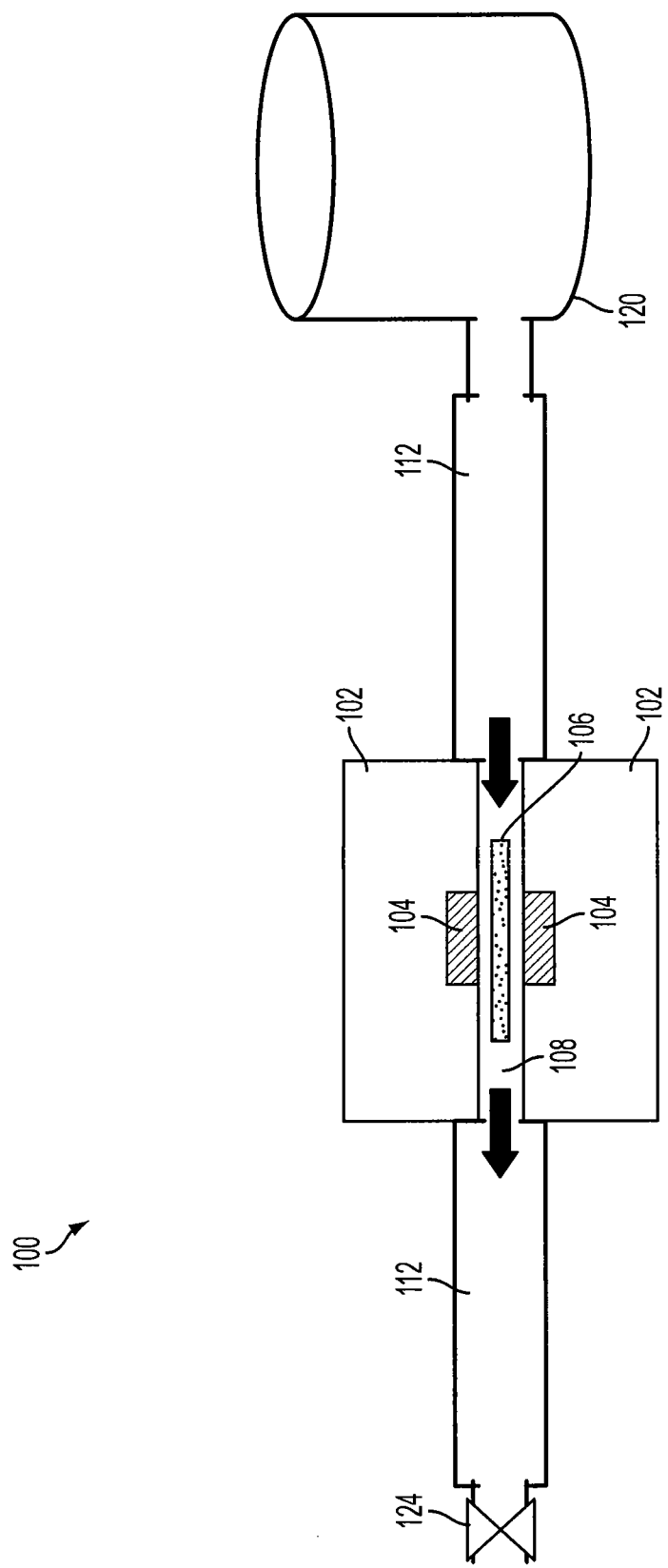

Aspects of the present invention include means for establishing and maintaining cryogenic temperature of a conducting member of a magnetic damper. This is accomplished using a cooling system having a cryogenic fluid confined in a fluid channel. The present invention may be embodied in any magnetic damping apparatus. Exemplary damping apparatus of the present invention are devices which achieve weight and volume efficiencies adequate to meet the requirements of most applications.

For the purpose of describing the function of the present invention, it may be assumed that an instrument or other material is subject to vibration caused by a vibrational force. The instrument subject to vibration may include a first portion (i.e. a base) and a second portion (i.e. a payload) which vibrates relative to the first portion. An exemplary damping apparatus of the present invention may be provided at the base to provide a damping force to the payload and, therefore, decrease the relative vibration. It will be understood, however, that the exemplary damping apparatus may be coupled with any body in which relative vibration is undesirable.

The damping force provided by the exemplary damping apparatus may be applied when weight and volume of the element are limited to predetermined amounts. The damping force provided by the exemplary damping apparatus, however, may also be applied to other applications, such as for example, ground test vibrations, vehicle vibration (i.e. cars, trains, planes, etc.), laboratory and fabrication equipment vibration (i.e. optical tables, micro-lithography and precision machine tools) and ground telescope isolation.

In general, exemplary damping apparatus of the present invention include at least one magnet and a conducting member movable relative to the magnet. Exemplary damping apparatus of the present invention decreases displacement by providing a damping force (e.g. through magnetically induced eddy currents) in opposition of the vibrational force on the payload. The vibrational force from the payload is applied to the conducting member (e.g., conductive vanes) of the damping apparatus, thereby causing the conducting member to vibrate relative to the magnet. A damping force is provided to the conducting member by the magnet as the conducting member moves relative to the magnet. The damping force on the conducting member, therefore, is applied to the payload, and the vibration of the payload is thereby damped.

The damping force on the conducting member of an exemplary damping apparatus may be increased by cryogenically cooling the conducting member. It is intended that aspects of the invention provide a fundamental way to efficiently establish and maintain cryogenic conductor temperature. As will be described, cryogenic conductor temperatures may be accomplished by applying a fluid at a cryogenic temperature (i.e., a cryogenic fluid). The conducting member is maintained at cryogenic temperatures by using a channel to contain the fluid in such a way that the fluid contacts a substantial portion of the conducting member (e.g., more than 50% of the surface of the conducting member).

The invention will now be described with regard to the accompanying drawings. FIGS. 1A-1E are diagrams of an exemplary damping apparatus 100 according to an aspect of the present invention. As described above, damping apparatus 100 may be used to damp the vibration of a payload relative to a base. Damping apparatus 100 includes a housing 102, magnets 104, conducting member 106, and channel 108. Additional details of damping apparatus 100 are now described below.

Housing 102 houses the elements of damping apparatus 100. Housing 102 may be fixed to the base (not shown) and provide support for the elements of damping apparatus 100. For example, magnets 104 may be fixed to housing 102. Additionally, housing 102 may in part define channel 108. Housing 102 may be formed in any shape to accommodate and support the elements of apparatus 100. Housing 102 may be formed from suitable non-magnetic materials or a combination of magnetic and non-magnetic materials.

Magnets 104 generate a magnetic field within damping apparatus 100. The position of magnets 104 may be fixed within housing 102. Pairs of magnets 104 may be spaced apart to generate a magnetic field extending between magnets 104. In an exemplary embodiment, magnets 104 are grouped in one or more pairs to define one or more gaps, as illustrated in FIGS. 1A and 1B. Additionally, multiple pairs of magnets 104 may define multiple gaps. The gaps defined by magnets 104 may define in part channel 108. Magnets 104 may be any suitable type of permanent magnets, such as rare earth magnets. Magnets 104 may also be electromagnets.

Conducting member 106 is movable with respect to magnets 104. Conducting member 106 may be connected to a payload (not shown) and positioned adjacent magnets 104. Conducting member 106 may be configured to vibrate in response to a vibration of the payload. For example, conducting member 106 may be directly coupled to the payload and, thereby, receive a direct vibrational force from the payload. Alternatively, conducting member 106 may extend from a rod or another member coupled to the payload. Conducting member 106 then receives an indirect vibrational force from the rod or other member in response to a vibration of the payload. Conducting member 106 may vibrate in any direction adjacent to magnet 104. Optionally, conducting member 106 vibrates in the plane of the gaps formed between magnets 104.

In an exemplary embodiment, conducting member 106 is a substantially flat sheet of conducting material, such as a conducting vane, as illustrated in FIGS. 1A-1C. While conducting member 106 is illustrated as a flat conducting vane, it will be understood that conducting member 106 may have any shape and orientation relative to magnets 104. Additionally, damping apparatus 100 may have any number of conducting members 106 disposed adjacent magnets 104. Conducting member 106 may be formed from good conductor materials such as, for example, copper or silver.

Channel 108 confines cryogenic fluid. Channel 108 confines cryogenic fluid such that the cryogenic fluid contacts conducting member 106. Channel 108 may be defined by housing 102, magnets 104, and/or conducting member 106. In an exemplary embodiment, channel 108 is defined between housing 102 and conducting member 106 and between magnets 104 and conducting member 106, as illustrated in FIGS. 1A and 1B. Use of magnets 104 and housing 102 for defining part of the boundary of channel 108 may simplify the design and thereby reduce manufacturing costs of damping apparatus 100.

Channel 108 is configured such that the cryogenic fluid contacts a substantial portion of the surface of conducting member 106. For example, channel 108 may be configured such that at least 50% of the surface of conducting member 106 is contacted by cryogenic fluid. Channel 108 may optionally be configured such that the cryogenic fluid covers the entire surface of conducting member 106. Channel 108 may additionally enable cryogenic fluid to cool housing 102 and magnets 104 along with conducting member 106. It will be understood that channel 108 may have any shape such that it confines cryogenic fluid in contact with conducting member 106.

Cryogenic fluid in channel 108 is used to maintain conducting member 106 at cryogenic temperatures. Accordingly, cryogenic fluid may be maintained at temperatures between 0 K and 200 K. Cryogenic fluid used with an open or vented channel 108 may be maintained at these temperatures by being stored in a well insulated pressurized container (e.g., a commercially available Cryostat or Dewar Flask, such as one of the CFN Series container provided by Cryofab, Inc.) until being released in a controlled discharge into the channel 108. Cryogenic fluid used with a closed channel 108 may be maintained at these temperatures by being forced to circulate through a heat exchanger kept at the desired temperature. Additionally, a cryocooler can be used to maintain the temperature of the heat exchanger, such as the cryocooler in the Near Infrared Camera and Multi-Object Spectrometer (NICMOS) system used on the Hubble spacecraft. Suitable cryogenic fluids for use with damping apparatus 100 include liquid or gaseous Nitrogen, Neon, or Helium. Other suitable cryogenic fluids will be understood by one of ordinary skill in the art from the description herein.

Channel 108 of damping apparatus 100 may be a closed channel or an open channel. When channel 108 is closed, the cryogenic fluid may be made to circulate through the apparatus 100 in contact with conducting member 106. Heat transfer between conducting member 106 and the cryogenic fluid may be predominantly due to convection and/or boiling. As such, when the cryogenic fluid is substantially in liquid form it may be desirable that channel 108 not be completed closed to allow for release of pressure as the cryogenic liquid absorbs heat and boils. Channel 108 may therefore include a vent or other means for venting the circulated cryogenic fluid. In an exemplary embodiment, the cryogenic fluid may flow along the surface of conducting members 106. One exemplary path for the flow of cryogenic fluid relative to conducting members 206 is indicated by arrows in FIGS. 1A and 1C. Circulating cryogenic fluid in a closed channel 108 may be particularly beneficial for uses of damping apparatus 100 when damping is required for long durations.

Figure 2:
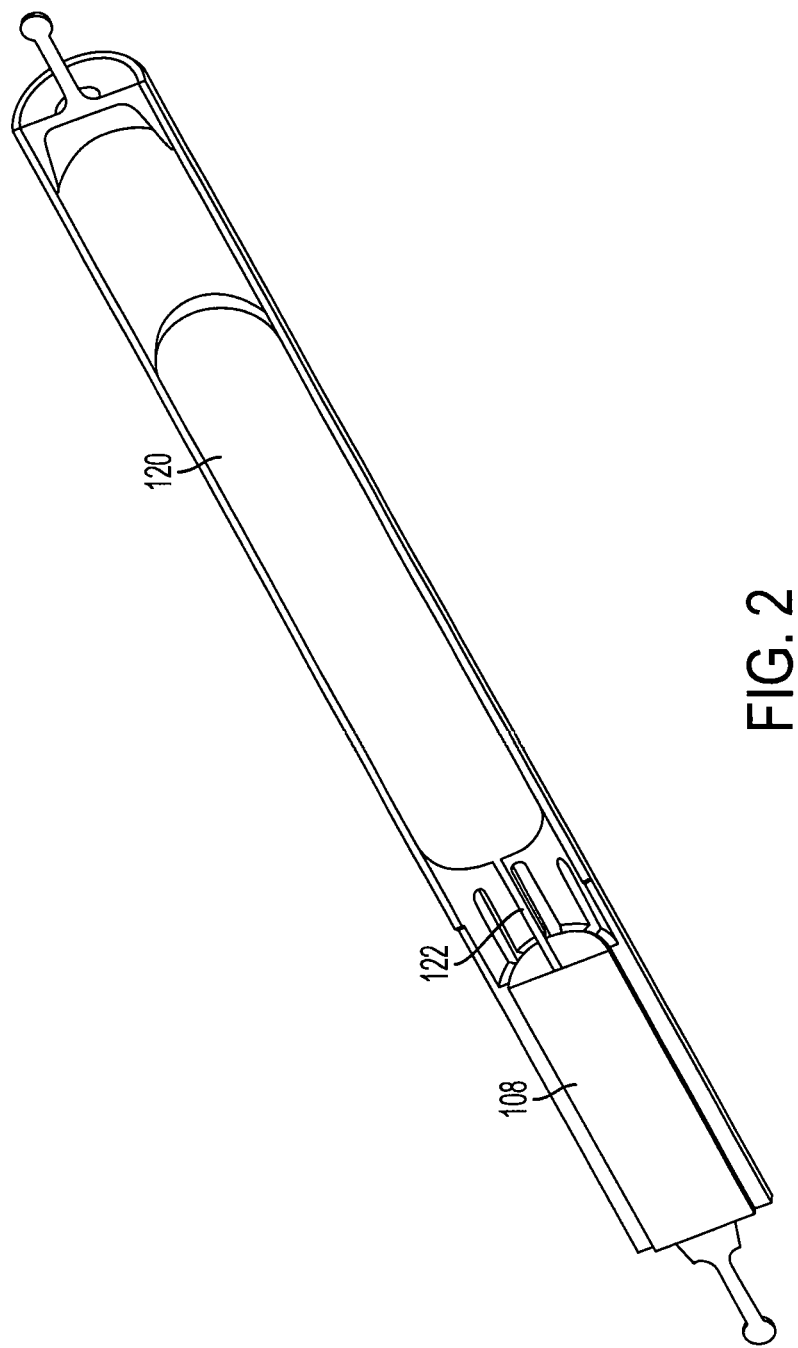
FIG. 2 is a cut-away perspective view of a fluid holder of an exemplary damping apparatus in accordance with an aspect of the present invention.

When channel 108 is open, the cryogenic fluid is in communication with the external environment. A coolant supply for venting cryogenic fluid through an open channel 108 is illustrated in FIG. 2 in accordance with an aspect of the present invention. In this embodiment, quick flow of cryogenic fluid could be generated by controlled release from a coolant holding tank 120. Coolant holding tank 120 may be pressurized to vent the cryogenic fluid. Cryogenic fluid may be forced by the pressure through a discharge valve 122 to channel 108 or a cryogenic fluid manifold. Discharge valve 122 may further vary the rate at which cryogenic fluid is released from coolant tank 120, as will be described below. The released cryogenic fluid may be vented to the environment surrounding damping apparatus 100 through vents (not shown) after flowing through channel 108 and contacting conducting member 106. Pressurized coolant holding tank 120 may be particularly beneficial for uses of damping apparatus 100 when damping is required for short durations.

Damping apparatus 100 may also include a pumping device. The degree to which cryogenic fluid cools conducting member 106 may depend on the speed at which the cryogenic fluid passes through channel 108. Accordingly, a pumping device may be employed to enhance cooling of conducting member 106 by forcing the cryogenic fluid to flow through channel 108. Where channel 108 is a closed channel, a pumping device may be used to circulate cryogenic fluid through channel 108. Where channel 108 is an open channel, a pumping device may be used to force cryogenic fluid out of the coolant holding tank. A suitable pump for circulating the cryogenic fluid could be the DCPA 120-4, available from Cryogenic Industries, or a custom-designed vacuum housing cryogenic pump, available from Barber Nichols. Other suitable pumping devices will be understood by those of ordinary skill in the art from the description herein.

Optionally, damping apparatus 100 may include a manifold 112 for directing the cryogenic fluid to and from channel 108. Manifold 112 may be used in embodiments that involve exhausting the cryogenic fluid and in embodiments that involve circulating the cryogenic fluid. As illustrated in FIG. 1D, for embodiments that do not involve circulation of the fluid, the manifold 112 may provide a flow path for the cryogenic fluid from the fluid supply tank 120 to the entrance to channel 108, and a path from the exit of channel 108 to an exit valve 124. For embodiments that involve circulation of the fluid, the manifold 112 may provide both an intake path to channel 108 and an exhaust path from channel 108.

Figure 1E:
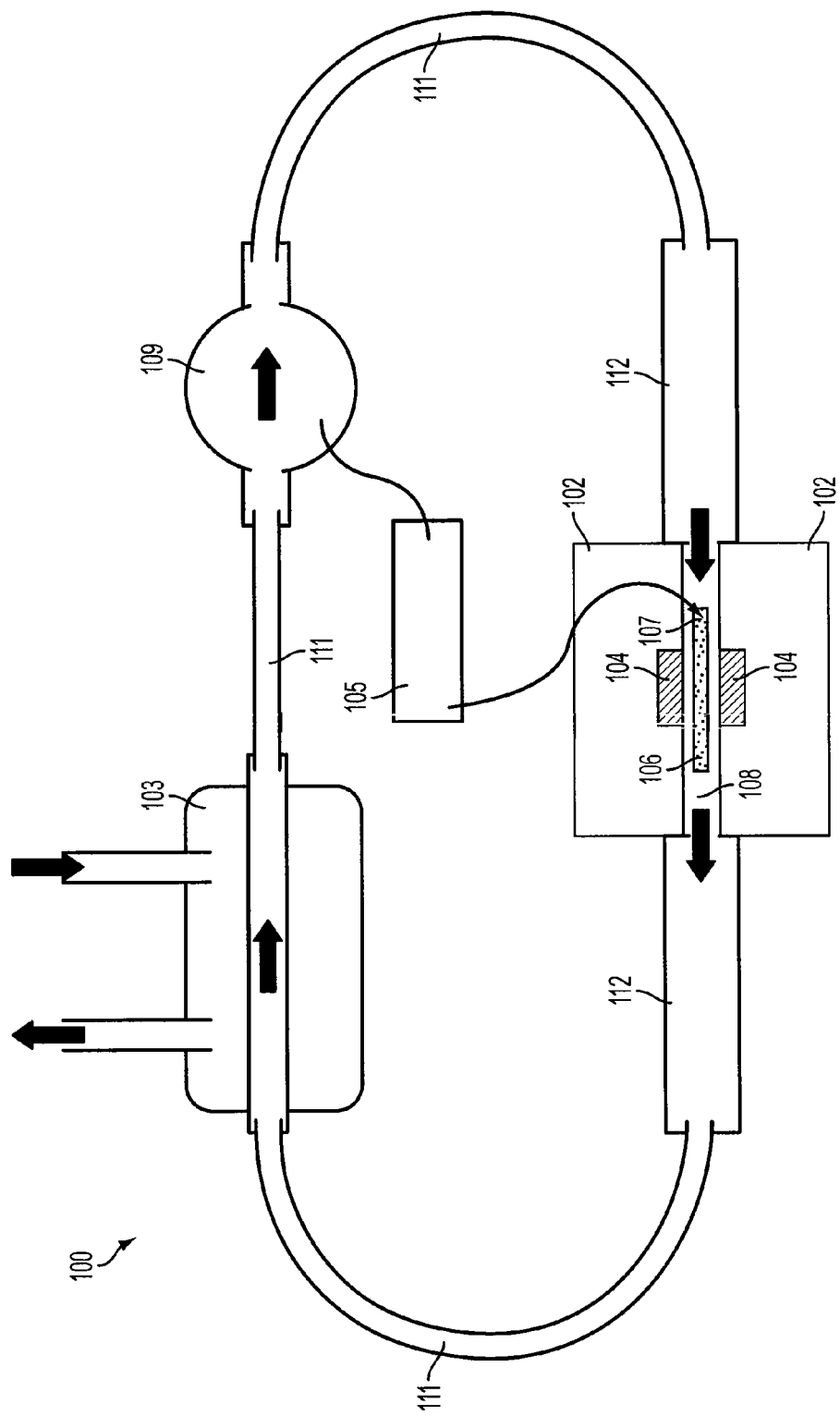

Damping apparatus 100 may optionally include a temperature sensor 107 for sensing the temperature of the conducting member, as illustrated in FIG. 1E. This temperature sensor may be configured to directly sense the temperature of the conductor, or instead may be configured to sense temperature at any nearby location, provided that the conductor temperature can be deduced from the sensed temperature with sufficient accuracy. Suitable temperature sensors include, for example, negative temperature coefficient sensors such as the Cryo-con R400 Ruthenium-oxide sensor, available from Cryogenic Control System, Inc.

Further, as illustrated in FIG. 1E, damping apparatus 100 may include a means for varying the flow rate of cryogenic fluid circulated by the pump 109. The cryogenic fluid may flow through a closed duct 111 (e.g., vacuum jacketed flexible transfer lines) and through a heat exchanger 103 in thermal contact with a cryocooler (not shown). The heat exchanger 103 and cryocooler may optionally be the same as used in the NICMOS system of the Hubble Space Telescope. In an exemplary embodiment, pump 109 may comprise the means for varying the flow rate of the cryogenic fluid. For example, pump 109 may comprise a variable speed pump or a constant speed pump with a variable restriction. Alternatively, discharge valve 122 may comprise the means for varying the flow rate of the cryogenic fluid. For example, the flow rate of the cryogenic fluid may be varied by controlling the speed at which discharge valve 122 releases cryogenic fluid from coolant holding tank 120.

The flow rate may be varied, for example, based on the sensed temperature of conducting member 106 using a feedback control system. The feedback control system includes a controller 105 to modulate pump speed or pump restriction, or control valve opening. Other suitable temperature sensors and means for varying the flow rate will be known to one of ordinary skill in the art from the description herein.

Operation of damping apparatus 100 will now be described. It will be understood to one of ordinary skill in the art that while damping apparatus 100 is discussed below, the principles described may apply to any of the embodiments of the damping apparatus disclosed herein in accordance with aspects of the present invention.

As described above, magnets 104 form a magnetic field, which may pass through the conducting member 106. The magnetic field may pass through conducting member 106 in a direction substantially orthogonal to the direction of motion of conducting member 106. Any movement of conducting member 106 within the magnetic field induces eddy currents in conducting member 106. Thus, movement of conducting member 106 due to vibration of the payload causes eddy currents circulate through conducting member 106. These eddy currents generate an opposing magnetic field through conducting member 106, which in turn generates a damping force on conducting member 106. The damping force generated by the eddy currents has a direction opposite the direction of motion of conducting member 108.

The damping force provided by damping apparatus 100 varies inversely with the electrical resistivity of conductor member 106. Accordingly, as described above, conducting member 106 may usually be formed from good conducting material such as, for example, copper or silver. Nonetheless, during operation of damping apparatus 100, substantial heat may be generated in conducting member 106 due to the circulating eddy currents. Because resistivity increases with increasing temperature, the damping force provided will decrease with temperature. The disclosed invention provides enhanced cooling in order to absorb the substantial heat generated from eddy currents that arise due to vibration of the conducting member. The conducting member may optimally be formed from a conducting material that experiences an increase in conductivity when a temperature of the conducting material is decreased. Thus, by maintaining conducting member 106 at cryogenic temperatures, the disclosed invention may cause its conductivity to be greater and its resistivity to be less than it is at room temperature, in some cases by orders of magnitude. This may allow for a high damping rate with respect to the weight of damping apparatus 100 in cryogenic environments. Additionally, damping apparatus 100 may be particularly useful in short duration launch vehicle applications. In these applications, it may be desirable to quickly force the cryogenic fluid through channel 108 to increase the rate of heat transfer from conducting member 106.

Figure 3A:
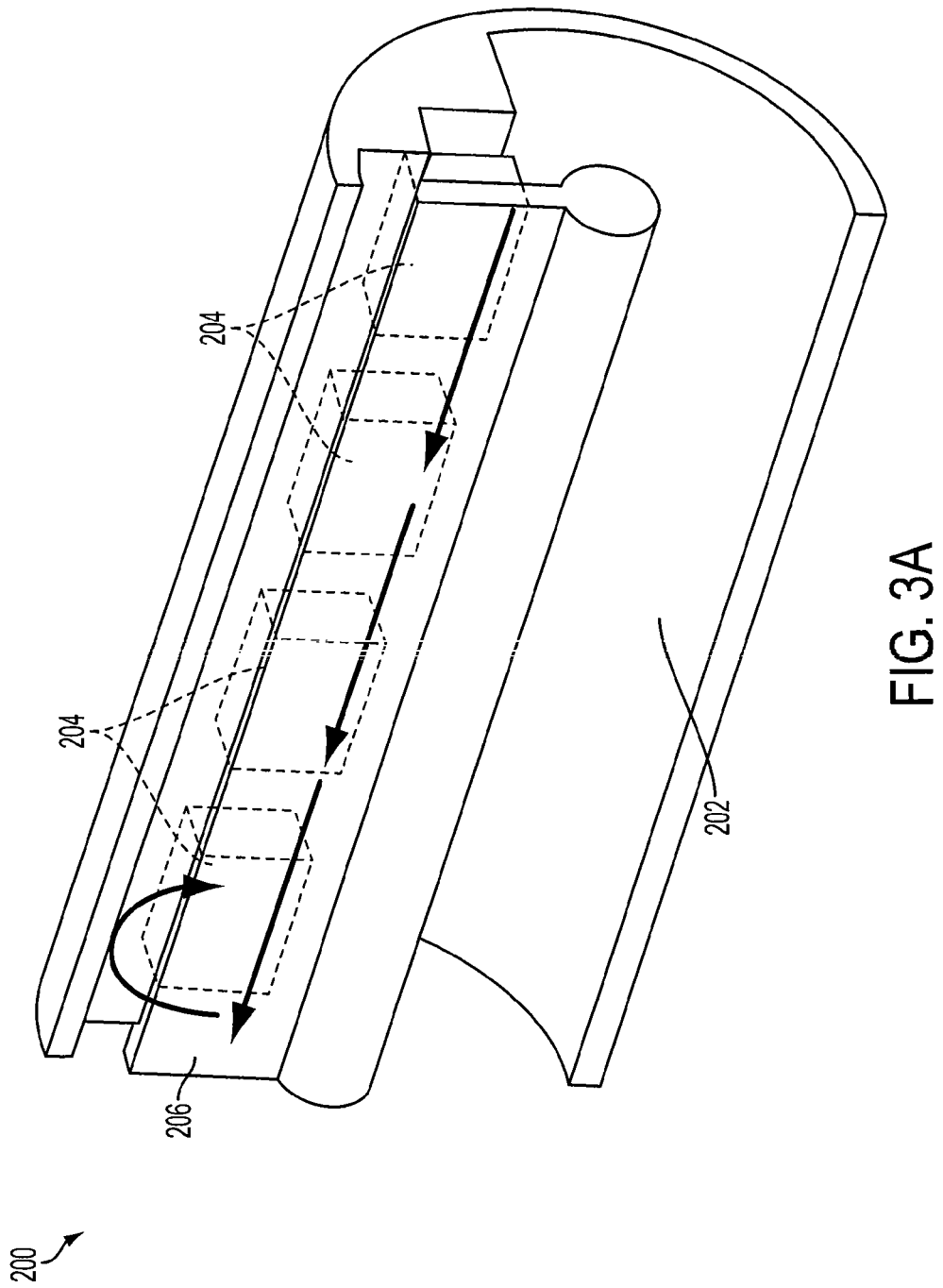
FIGS. 3A-3B are cut-away perspective and end views of another exemplary damping apparatus in accordance with an aspect of the present invention.
Figure 3B:
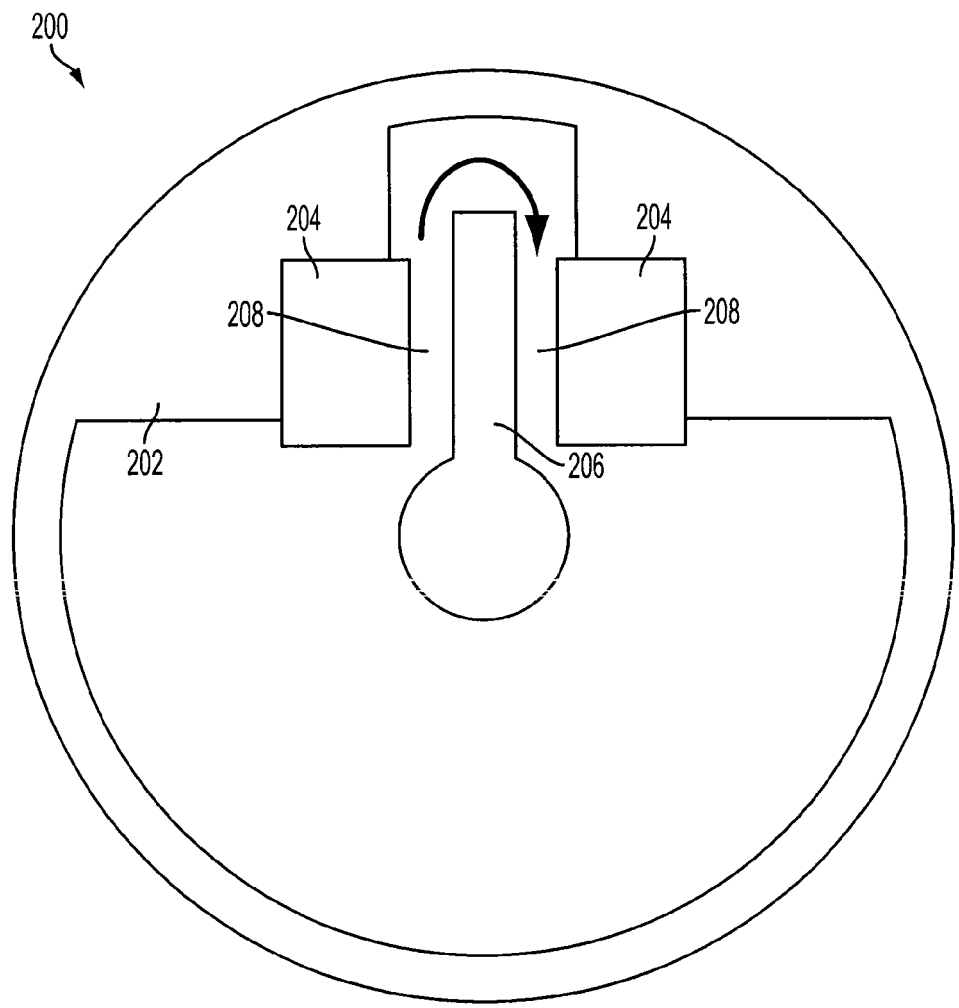

FIGS. 3A and 3B are diagrams of an exemplary damping apparatus 200 according to an aspect of the present invention. Damping apparatus 200 may be used to damp the vibration of a payload relative to a base. Damping apparatus 200 includes a housing 202, magnets 204, conducting member 206, and channel 208. Additional details of damping apparatus 200 are now described below.

Housing 202 houses the elements of damping apparatus 200. Housing 202 may be fixed to the base (not shown) and provide support for the elements of damping apparatus 200.

For example, magnets 204 are fixed to housing 202. Additionally, housing 202 may in part define channel 208. Housing 202 may be approximately cylindrical in shape. However, it will be understood that housing 202 may be formed in any shape to accommodate and support the elements of apparatus 200. Housing 202 may be formed from suitable non-magnetic materials or a combination of magnetic and non-magnetic materials.

Magnets 204 generate a magnetic field within damping apparatus 200. The position of magnets 204 may be fixed within housing 202. As illustrated in FIG. 3B, pairs of magnets 204 may be spaced apart to generate a magnetic field extending between magnets 204. The opposing magnets 204 in each pair are omitted in FIG. 3A to aid illustration of the components of damping apparatus 200. In an exemplary embodiment, magnets 204 are grouped in one or more pairs to define one or more gaps. Additionally, multiple pairs of magnets 204 may define multiple gaps. The gaps defined by magnets 204 may define in part channel 208. Magnets 204 may be any suitable type of permanent magnets, such as rare earth magnets. Magnets 204 may also be electromagnets.

Conducting member 206 is movable with respect to magnets 204. Conducting member 206 may be connected to a payload (not shown) and positioned adjacent magnets 204. Conducting member 206 may be configured to vibrate in response to a vibration of the payload. As illustrated in FIGS. 3A and 3B, conducting member 206 may extend from a rod that is coupled to the payload. Conducting member 206 thereby receives an indirect vibrational force from the rod in response to a vibration of the payload. In an exemplary embodiment, conducting member 206 may be a substantially flat sheet of conducting material, such as a conducting vane, as illustrated in FIG. 3A. Conducting member 206 may extend axially through housing 202 and vibrate in the axial direction adjacent to magnets 204. Optionally, conducting member 206 vibrates in the plane of the gaps formed between magnets 204, i.e., into and out of the page in FIG. 3B. Conducting member 206 may be formed from good conductor materials such as, for example, copper or silver.

While conducting member 206 is illustrated as a flat conducting vane, it will be understood that conducting member 206 may have any shape and orientation relative to magnets 204. Additionally, damping apparatus 200 may have any number of conducting members 206 disposed adjacent magnets 204. For example, damping apparatus 200 could include multiple pairs of magnets 204 oriented at different circumferential intervals within housing 202. Damping apparatus could then include multiple different conducting members 206 extending in different radial directions within housing 202 to be positioned within the gaps formed by magnets 204.

Channel 208 confines cryogenic fluid. Channel 208 confines cryogenic fluid such that the cryogenic fluid contacts conducting member 206. In an exemplary embodiment, channel 208 is defined between housing 202 and conducting member 206 and between magnets 204 and conducting member 206, as illustrated in FIG. 3B. Use of magnets 204 and housing 202 for defining part of the boundary of channel 208 may simplify the design and thereby reducing manufacturing cost of damping apparatus 200. As illustrated in FIG. 3B, channel 208 may extend axially within housing 202.

Channel 208 is configured such that the cryogenic fluid contacts a substantial portion of the surface of conducting member 206, e.g., at least 50% of the surface of conducting member 206. Channel 208 may optionally be configured such that the cryogenic fluid covers the entire surface of conducting member 206. Channel 208 may additionally enable cryogenic fluid to cool housing 202 and magnets 204 along with conducting member 206. However, it will be understood that channel 208 may have any shape such that it confines cryogenic fluid in contact with conducting member 206. The cryogenic fluid for use with damping apparatus 200 may be the same as described above with respect to apparatus 100.

Channel 208 of damping apparatus 200 may be a closed channel or an open channel. When channel 208 is closed, the cryogenic fluid may be made to circulate through the apparatus 200 in contact with conducting member 206. For example, cryogenic fluid may flow in an axial direction through housing 202. Cryogenic fluid may flow in one axial direction on one side of conducting member 206, and flow in the opposite direction on the other side of conducting member 206. Additionally, cryogenic fluid may flow in a circumferential direction around conducting member 206. Exemplary paths for the flow of cryogenic fluid relative to conducting member 206 is indicated by arrows in FIGS. 3A and 3B.

As described above, it may be desirable when the cryogenic fluid is chosen to be in liquid form that channel 208 not be completed closed to allow for release of pressure as the cryogenic liquid absorbs heat and boils. As such, channel 208 may include some means for venting cryogenic gas into the environment.

When channel 208 is open, the cryogenic fluid may be in communication with the external environment. Accordingly, damping apparatus may employ a cryogenic fluid holder as described above with respect to damping apparatus 100. A cryogenic fluid holder may release cryogenic fluid at one axial end of housing 202. The coolant may then flow axially through housing 202 and be vented into the external environment through vents (not shown) at the opposite end of housing 202. Optionally, damping apparatus 200 may include a manifold for receiving the cryogenic fluid at the end of housing 202 and either returning the fluid for circulation or providing ventilation of the fluid to the surrounding environment.

As described above with respect to damping apparatus 100, damping apparatus 200 may include a pumping device, temperature sensor(s), and/or means for varying the flow rate of cryogenic fluid.

Figure 4A:
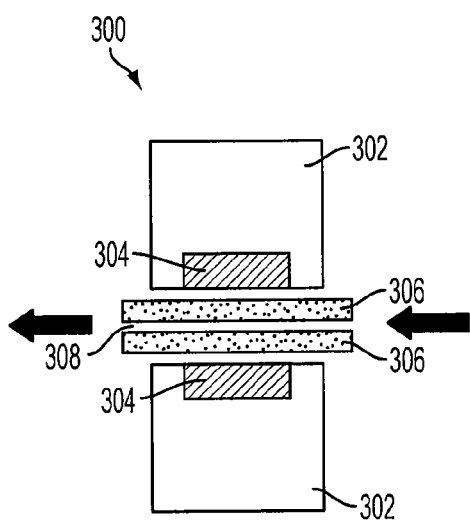
FIGS. 4A-4C are diagrams of yet another exemplary damping apparatus in accordance with an aspect of the present invention.
Figure 4B:
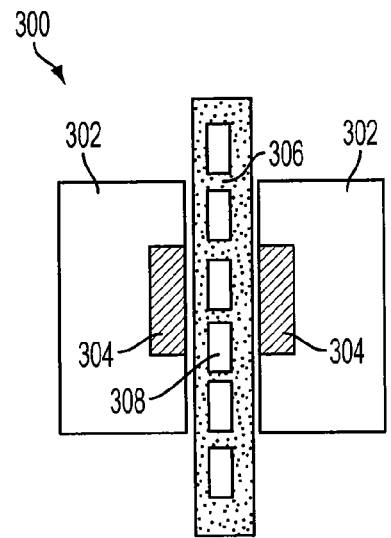
Figure 4C:
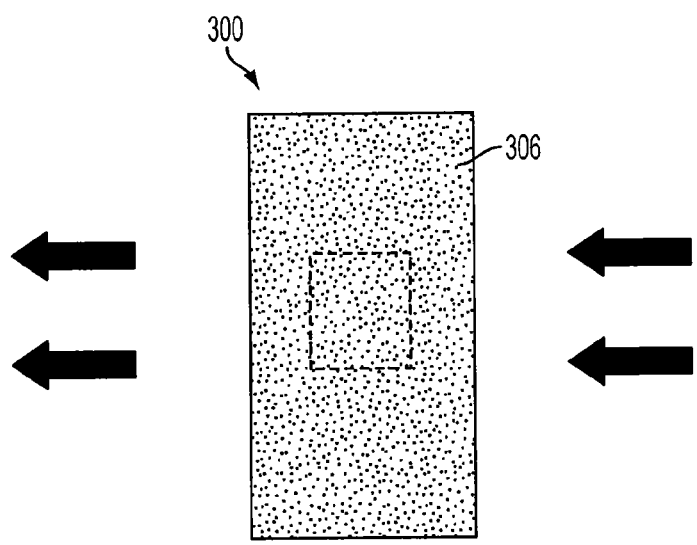

FIGS. 4A-4C are diagrams of an exemplary damping apparatus 300 according to an aspect of the present invention. Damping apparatus 300 may be used to damp the vibration of a payload relative to a base. Damping apparatus 300 includes a housing 302, magnets 304, conducting member 306, and channel 308. Damping apparatus 300 is substantially the same as damping apparatus 100 except as described below.

Conducting member 306 includes hollow portions for defining at least part of channel 308. In an exemplary embodiment, conducting member 306 is a substantially flat piece of conducting material defining one or more hollow portions, as illustrated in FIGS. 4A and 4B. The hollow portions defined by conducting member 306 form at least part of channel 308. While conducting member 306 is illustrated as defining a number of linear hollow portions extending axially with conducting member 306, it will be understood by one of ordinary skill in the art that the hollow portions illustrated in FIGS. 4A and 4B are illustrative and not limiting. Conducting member 306 may define any number of hollow portions to serve as at least part of channel 308.

Conducting member 306 may be formed by constructing two or more ply laminations of conducting plates separated by spacers to form the hollow portions. This formation enables fluid flow to be contained within the conductor plates of conducting member 306. Alternative methods of forming a conducting member having hollow portions will be understood by one of ordinary skill in the art from the description herein.

Channel 308 confines cryogenic fluid such that the cryogenic fluid contacts conducting member 306. In an exemplary embodiment, channel 308 is defined by the hollow portions within conducting member 306, as illustrated in FIGS. 4A and 4B. Channel 308 is configured such that the cryogenic fluid contacts the interior surface of conducting member 306. Channel 308 may thus be confined to the interior of conducting member 306 so that only conducting member 306 is substantially cooled by the cryogenic fluid. This may provide for more efficient cooling of conducting member 306 than damping apparatus 100. While channel 308 is illustrated as a number of linear hollow portions extending axially with conducting member 306, it will be understood by one of ordinary skill in the art that the hollow portions illustrated in FIGS. 4A and 4B are illustrative and not limiting. Channels 308 may have any shape such that it confines cryogenic fluid within the interior of conducting member 306.

Cryogenic fluid may be made to circulate through channel 308 within conducting member 306. In an exemplary embodiment, the cryogenic fluid may flow in one direction through some hollow portions of conducting member 306 and in the other direction through other hollow portions of conducting member 306. One exemplary path for the flow of cryogenic fluid relative to conducting member 306 is indicated in FIGS. 4A and 4B.

Figure 5A:
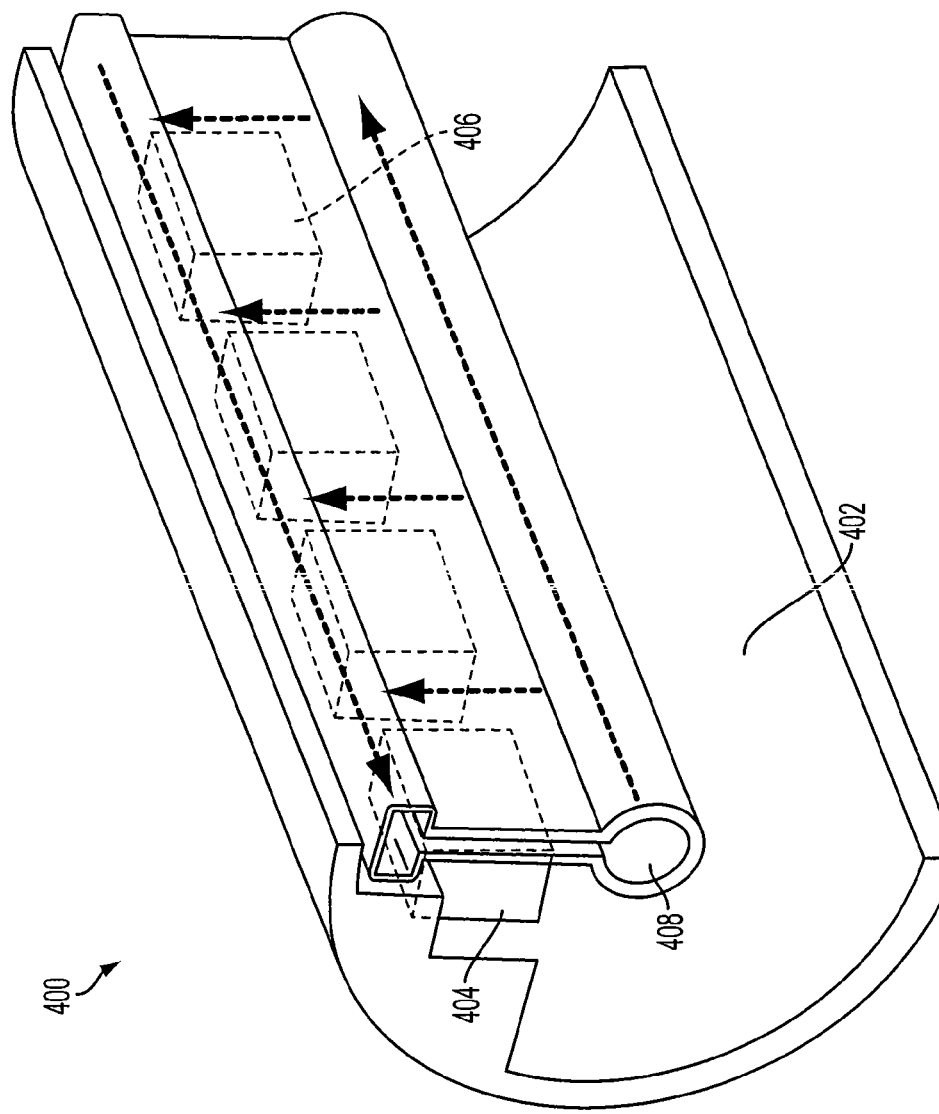
FIGS. 5A-5B are cut-away perspective and end views of another exemplary damping apparatus in accordance with an aspect of the present invention.
Figure 5B:
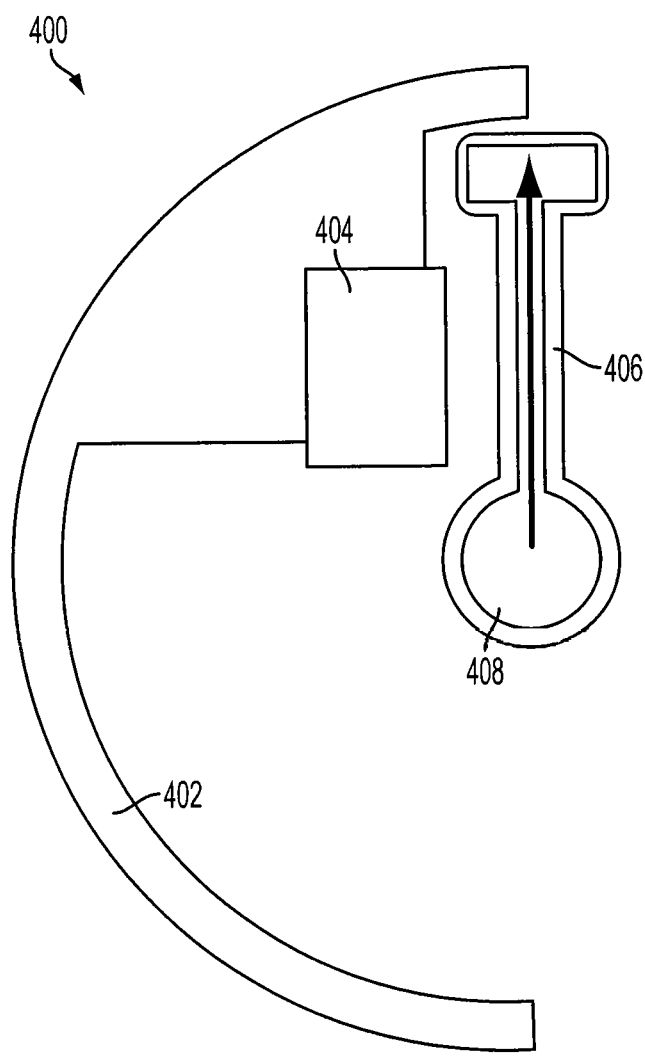

FIGS. 5A and 5B are diagrams of an exemplary damping apparatus 400 according to an aspect of the present invention. Damping apparatus 400 may be used to damp the vibration of a payload relative to a base. Damping apparatus 400 includes a housing 402, magnets 404, conducting member 406, and channel 408. Damping apparatus 400 is substantially the same as damping apparatus 200 except as described below.

Conducting member 406 includes hollow portions for defining at least part of channel 408. In an exemplary embodiment, conducting member 406 is formed from a substantially flat piece of conducting material defining one or more hollow portions, as illustrated in FIGS. 5A and 5B. The hollow portions defined by conducting member 406 form at least part of channel 408. Conducting member 406 may further include one or more widened hollow portions, as illustrated in FIGS. 5A and 5B, to enable circulation of cryogenic fluid within conducting member 406. While conducting member 406 is illustrated as defining one large hollow cavity extending axially within conducting member 406, it will be understood by one of ordinary skill in the art that the hollow portion illustrated in FIGS. 5A and 5B is illustrative and not limiting. Conducting member 406 may define any number of hollow portions to serve as at least part of channel 408.

Conducting member 406 may be formed by constructing two or more ply laminations of conducting plates separated by spacers to form the hollow portions. This formation enables fluid flow to be contained within the conductor plates of conducting member 406. Additional spacers may be used to form widened hollow portions for promoting cryogenic fluid circulation. Alternative methods of forming a conducting member having hollow portions will be understood by one of ordinary skill in the art from the description herein.

Channel 408 confines cryogenic fluid such that the cryogenic fluid contacts conducting member 406. In an exemplary embodiment, channel 408 is defined by the hollow cavity within conducting member 406, as illustrated in FIGS. 5A and 5B. Channel 408 is configured such that the cryogenic fluid contacts a substantial portion of the interior surface of conducting member 406. Channel 408 may optionally be configured such that the cryogenic fluid contacts the entire interior surface of conducting member 406. Channel 408 may be confined to the interior of conducting member 406 so that only conducting member 406 is substantially cooled by the cryogenic fluid. This may provide for more efficient cooling of conducting member 406 than damping apparatus 200. While channel 408 is illustrated as a single hollow portion extending axially within conducting member 406, it will be understood by one of ordinary skill in the art that the hollow portion illustrated in FIGS. 5A and 5B is illustrative and not limiting. Channels 408 may have any shape such that it confines cryogenic fluid within the interior of conducting member 406.

Cryogenic fluid may be made to circulate through channel 408 within conducting member 406. In an exemplary embodiment, the cryogenic fluid may flow in one direction through a widened hollow portion of conducting member 406 and in the other direction through another widened hollow portion of conducting member 406. Cryogenic fluid may flow between the widened hollow portions through a narrower hollow portion or through narrower ducts. One exemplary path for the flow of cryogenic fluid relative to conducting member 406 is indicated in FIGS. 5A and 5B.

Figure 6A:
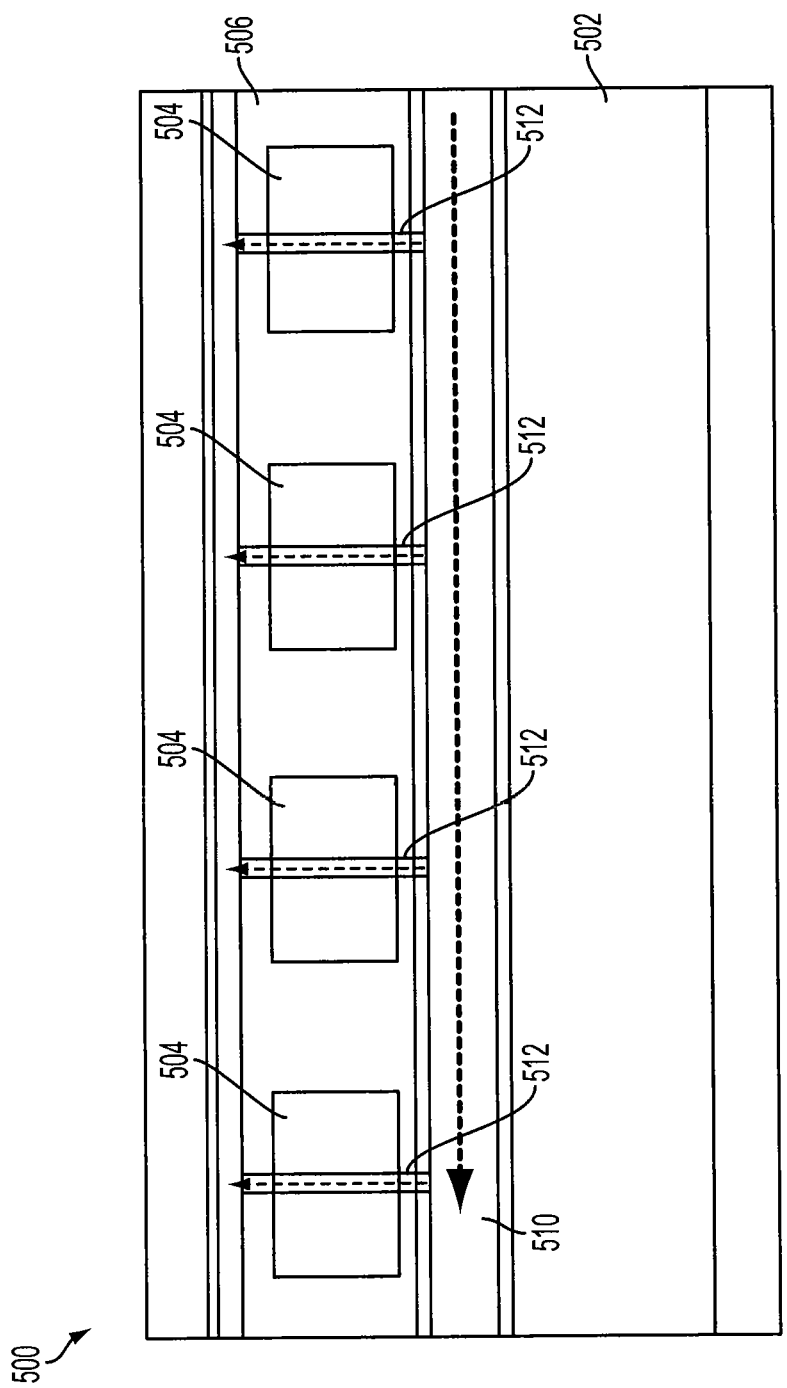
FIGS. 6A-6C are cut-away side, perspective, and end views of still another exemplary damping apparatus in accordance with an aspect of the present invention.
Figure 6B:
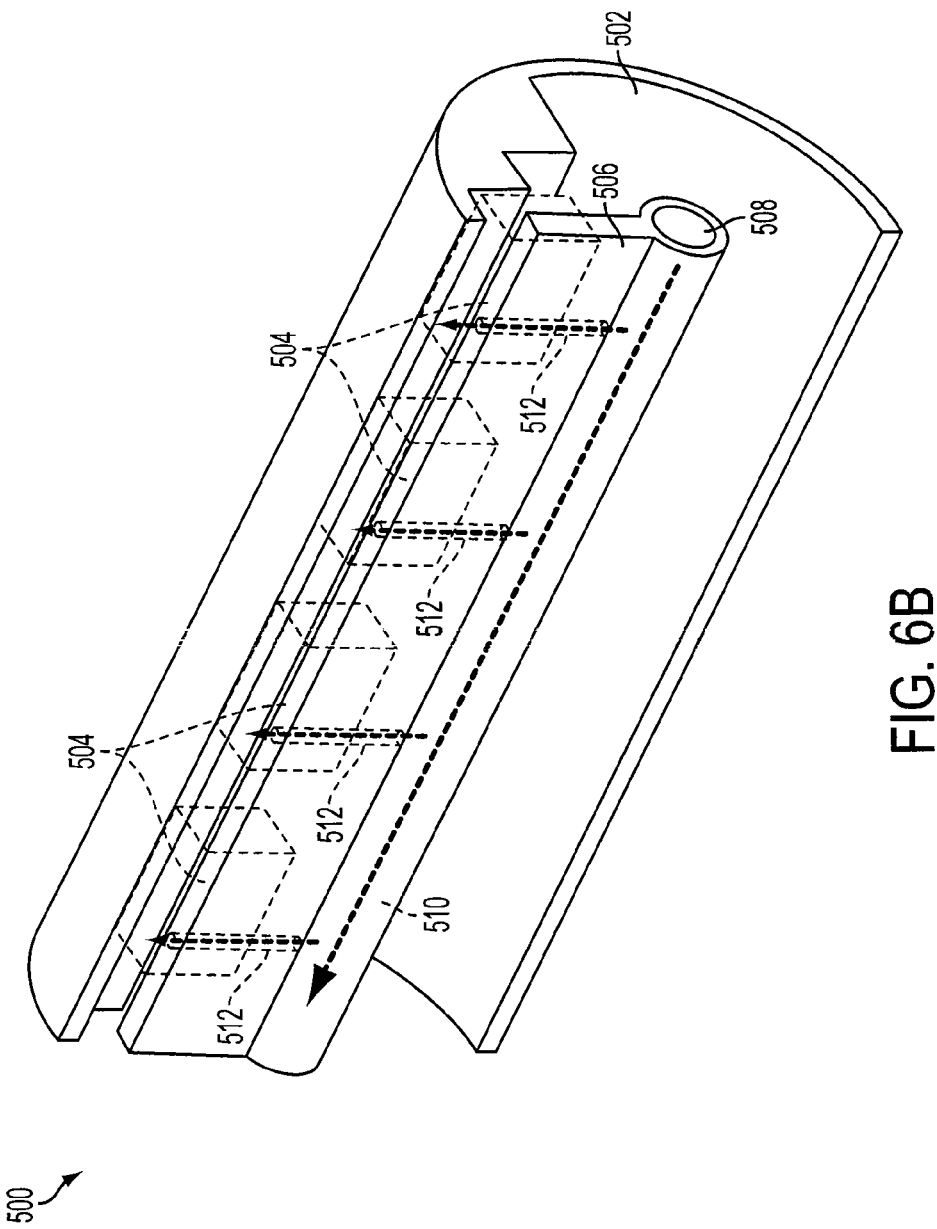
Figure 6C:
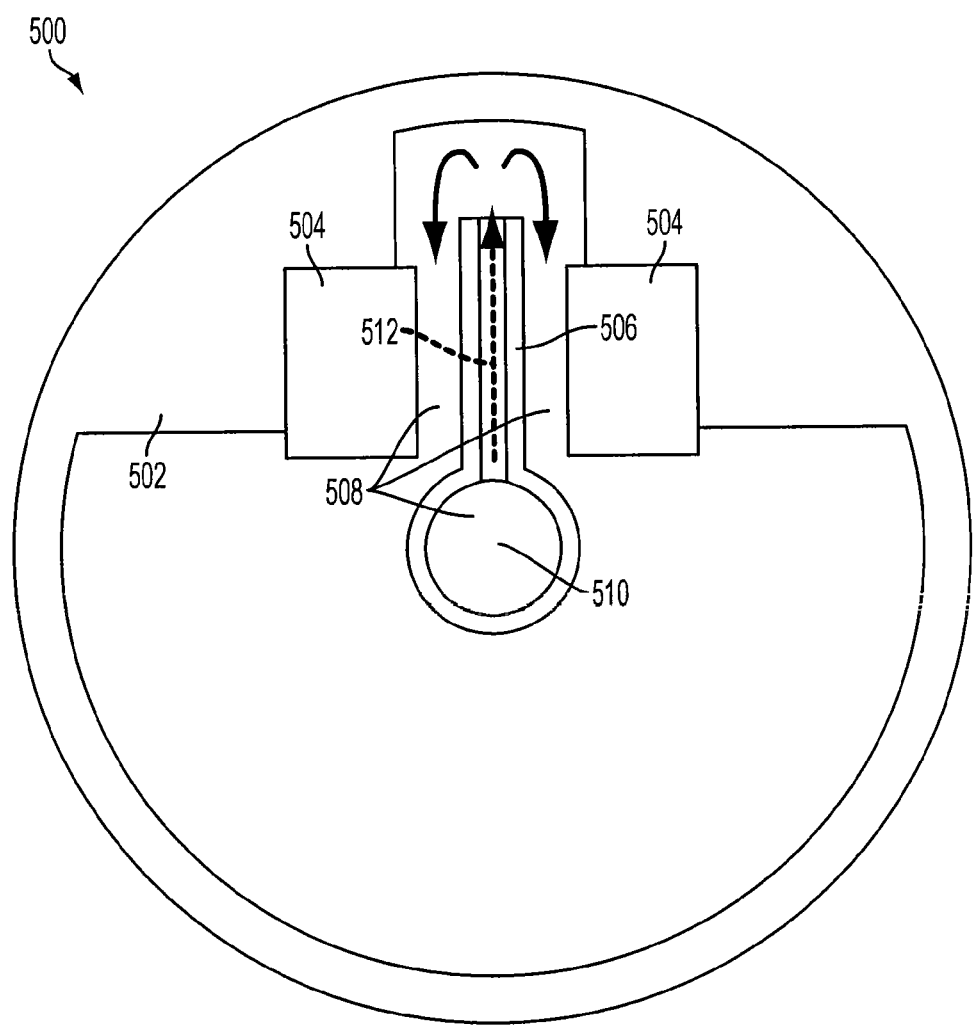

FIGS. 6A-6C are diagrams of an exemplary damping apparatus 500 according to an aspect of the present invention. Damping apparatus 500 may be used to damp the vibration of a payload relative to a base. Damping apparatus 500 includes a housing 502, magnets 504, conducting member 506, and channel 508. Damping apparatus 500 is substantially the same as damping apparatus 200 & 400 except as described below.

Conducting member 506 includes hollow portions for defining at least part of channel 508. In an exemplary embodiment, conducting member 406 is formed from a substantially flat piece of conducting material defining one or more hollow portions, as illustrated in FIGS. 5A and 5B. The hollow portions defined by conducting member 506 form at least part of channel 508.

Conducting member 506 may include one or more widened hollow portions 510 extending axially through conducting member 506. Conducting member 506 may further include narrower hollow portions 512 branching from the widened hollow portion 510, as illustrated in FIGS. 6A and 6B. The narrow branching portions 512 may be open to the interior of housing 502. Conducting member 506 may thereby allow cryogenic fluid to flow outward from branching portions 512 of conducting member 506 to contact housing 502 and magnets 504. This may promote circulation of cryogenic fluid within apparatus 500. Narrow branching portions 512 may further be located in areas of conducting member 506 adjacent magnets 504. This may promote cooling of conducting member 506 in the areas adjacent magnets 504, where most of the eddy currents are generated during vibration of conducting member 506. Because eddy currents are generated in areas of conducting member 506 adjacent the edges of magnets 504, branching portions 512 may optionally be located in areas of conducting member 506 corresponding to the center of magnets 504 and away from the edges of magnets 504, in order to minimize disruption of the paths of eddy currents, which may cause a decrease in damping force of damping apparatus 500.

While conducting member 506 is illustrated as defining a hollow portion having narrower branching portions, it will be understood by one of ordinary skill in the art that the hollow portion illustrated in FIGS. 6A and 6B is illustrative and not limiting. Conducting member 506 may define any number of wide hollow portions 510 or narrow branching portions 512 to serve as at least part of channel 508. Conducting member 506 may be formed substantially as described with respect to conducting member 406.

Channel 508 confines cryogenic fluid such that the cryogenic fluid contacts conducting member 506. In an exemplary embodiment, channel 508 is defined by the hollow portions 510 and 512 of conducting member 506 when flowing through conducting member 506, and also by the housing 502, magnets 504, and external surface of conducting member 506 when flowing through damping apparatus 500. Channel 508 is configured such that the cryogenic fluid contacts a substantial portion of both the interior and exterior surfaces of conducting member 506. Channel 508 may optionally be configured such that the cryogenic fluid contacts the entire interior and exterior surfaces of conducting member 506. As described above, channel 508 may be configured such that cryogenic fluid contacts the areas of conducting member 506 adjacent magnets 504. This may provide for more efficient cooling of conducting member 506 in areas where eddy currents will be generated.

Cryogenic fluid may be made to circulate through channel 508 within conducting member 506. In an exemplary embodiment, the cryogenic fluid may flow through the widened hollow portion 510 of conducting member 506 and out through the narrow branch portions 512. Cryogenic fluid may then flow around the outside of conducting member 506 within housing 502. As described above, cryogenic fluid may be collected in a manifold after flowing through housing 502 for recirculation or venting to the external environment. One exemplary path for the flow of cryogenic fluid relative to damping apparatus is indicated in FIGS. 6A-6C.

In each of the embodiments described above, the temperature of the conducting members depends in part on the temperature of the cryogenic fluid and the heat transfer coefficient between the cryogenic fluid and the conducting members. Since the heat transfer coefficient generally increases as the cryogenic fluid flow rate increases, heat transfer (or cooling rate) can be controlled by varying flow rate of the cryogenic fluid. As such, it is understood that all the embodiments described above may be augmented to include a means for sensing temperature and generating a related feedback signal, and a means for varying the volume rate of flow discharged by pump in response to the feedback control signal. Additionally, where cryogenic fluid is held in a coolant tank, a feedback signal may be used based on the sensed temperature for controlling the release of the cryogenic fluid from the coolant tank.

Although the invention is illustrated and described herein with reference to specific embodiments, the invention is not intended to be limited to the details shown. Rather, various modifications may be made in the details within the scope and range of equivalents of the claims and without departing from the invention. It will be understood that the features disclosed by each of the embodiments may be omitted or combined with other embodiment, and that each embodiment is not limited to the particular set of features it discloses.

What is claimed:

1. A damping apparatus comprising:
   at least two magnets, each having opposing end surfaces;
   a conducting member movable relative to the magnets;
   a cryogenic fluid; and
   a channel that confines the cryogenic fluid in contact with the conducting member, the channel defined at least in part by multiple hollow portions internal to the conducting member, wherein the multiple hollow portions comprise at least one longitudinally extending widened hollow portion and narrower hollow portions branching from the widened hollow portion;
   wherein each of the narrower hollow portions is between the end surfaces of each magnet, in which the end surfaces are transverse to a longitudinal direction of the conducting member.

2. The damping apparatus of claim 1, wherein the channel confines the cryogenic fluid such that the cryogenic fluid contacts an interior surface and an exterior surface of the conducting member.

3. The damping apparatus of claim 1, wherein the channel confines the cryogenic fluid such that the cryogenic fluid contacts the conducting member at an area of the conducting member adjacent the at least two magnets.

4. A damping apparatus comprising:
   at least one magnet having opposing end surfaces;
   a conducting member movable relative to the magnet; and
   a channel adapted to confine a cryogenic fluid in contact with the conducting member, the channel defined at least in part by multiple hollow portions internal to the conducting member; wherein the multiple hollow portions comprise at least one longitudinally extending widened hollow portion and narrower hollow portions branching from the widened hollow portion;
   wherein each of the narrower hollow portions is between the end surfaces of the magnet, in which the end surfaces are transverse to a longitudinal direction of the conducting member.

5. The damping apparatus of claim 4, wherein the channel confines the cryogenic fluid such that the cryogenic fluid contacts an interior surface and an exterior surface of the conducting member.

6. The damping apparatus of claim 4, wherein the channel confines the cryogenic fluid such that the cryogenic fluid contacts the conducting member at an area of the conducting member adjacent the at least one magnet.

* * * * *